United States Patent [19]

Smith

[11] 4,352,432

[45] Oct. 5, 1982

[54] BICYCLE STORAGE RACK

[76] Inventor: Terrance R. Smith, 28 Roundhay Dr., Ottawa, Ontario, Canada, K2G 1B5

[21] Appl. No.: 62,944

[22] Filed: Aug. 2, 1979

Related U.S. Application Data

[63] Continuation-in-part of Ser. No. 806,307, Jun. 13, 1977, abandoned.

[51] Int. Cl.$^3$ ............................ A47F 7/04; B62H 3/08
[52] U.S. Cl. ........................................ 211/19; 70/235;
211/5; 211/21
[58] Field of Search .................. 211/5, 17, 18, 19, 20,
211/21, 22, 23, 24; 70/233, 234, 235; 248/226.4;
24/255 R, 259 R; 269/254 R, 271, 282, 283

[56] References Cited

U.S. PATENT DOCUMENTS

| 545,631 | 9/1895 | Knowlden | 211/19 |
|---|---|---|---|
| 567,625 | 9/1896 | Waterman | 211/21 |
| 570,465 | 11/1896 | Dilley et al. | 211/19 |
| 613,773 | 11/1898 | Neumann | 211/17 X |
| 613,963 | 11/1898 | Breininger | 211/19 |
| 625,657 | 5/1899 | Elliott | 211/19 |
| 3,128,119 | 4/1964 | Walter | 24/259 R X |
| 3,682,523 | 8/1972 | Esposito | 211/23 X |
| 3,907,113 | 9/1975 | Kropelnitski | 211/19 |
| 4,015,718 | 4/1977 | Bernard | 211/5 |
| 4,063,647 | 12/1977 | Blackmore | 211/19 |

FOREIGN PATENT DOCUMENTS

| 58677 | 5/1941 | Denmark | 211/19 |
|---|---|---|---|
| 466850 | 9/1928 | Fed. Rep. of Germany | 211/17 |
| 156188 | 1/1939 | Fed. Rep. of Germany | 211/17 |
| 1559084 | 1/1969 | France | 248/226 H |
| 115530 | 5/1918 | United Kingdom | 211/22 |
| 250124 | 4/1926 | United Kingdom | 211/20 |

*Primary Examiner*—Thomas J. Holko

[57] ABSTRACT

A bicycle storage rack permitting storage of a bicycle in a vertical position in which a U-channel having walls which are slightly distendable from each other and a number of restraint means along the length thereof is adapted to releasably restrain the front wheels of a bicycle by engagement with the lateral surface of the rim. Provision is also made for bicycles having wheels of various diameters, and as well the rack is adapted to be pivoted, so that a bicycle may be stored at a relatively acute angle, relative to the supporting surface.

7 Claims, 14 Drawing Figures

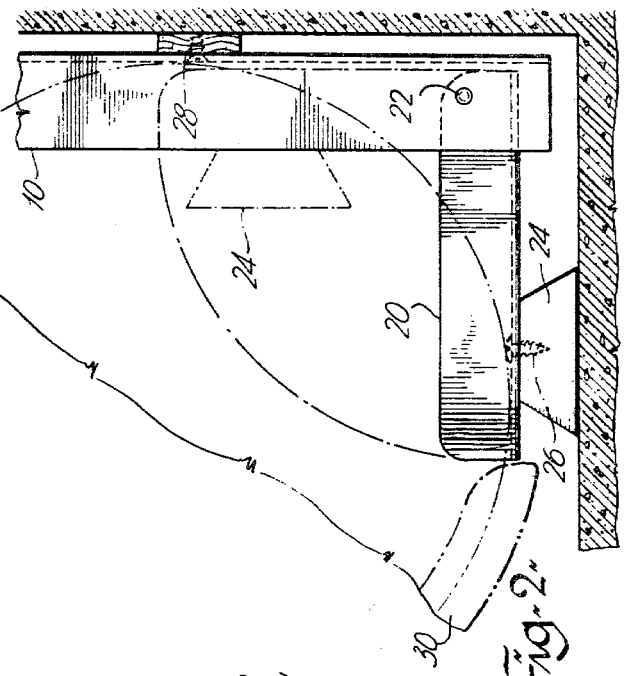
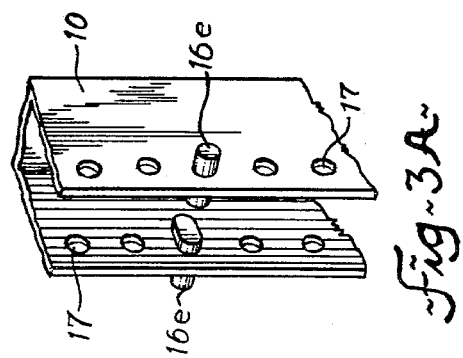
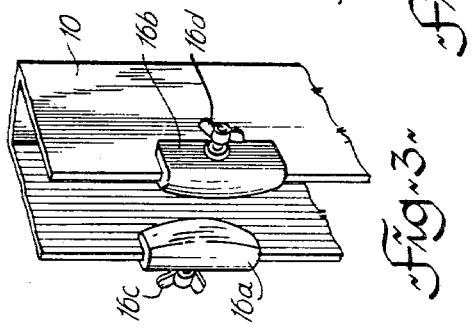
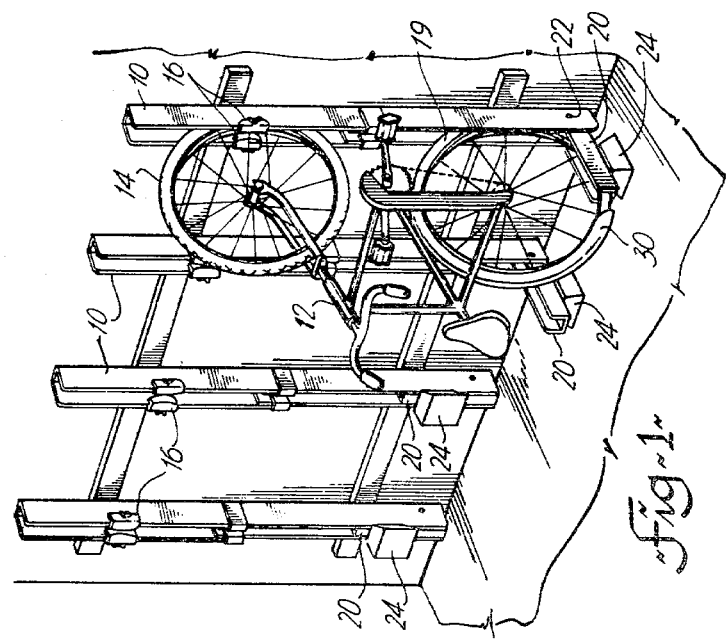

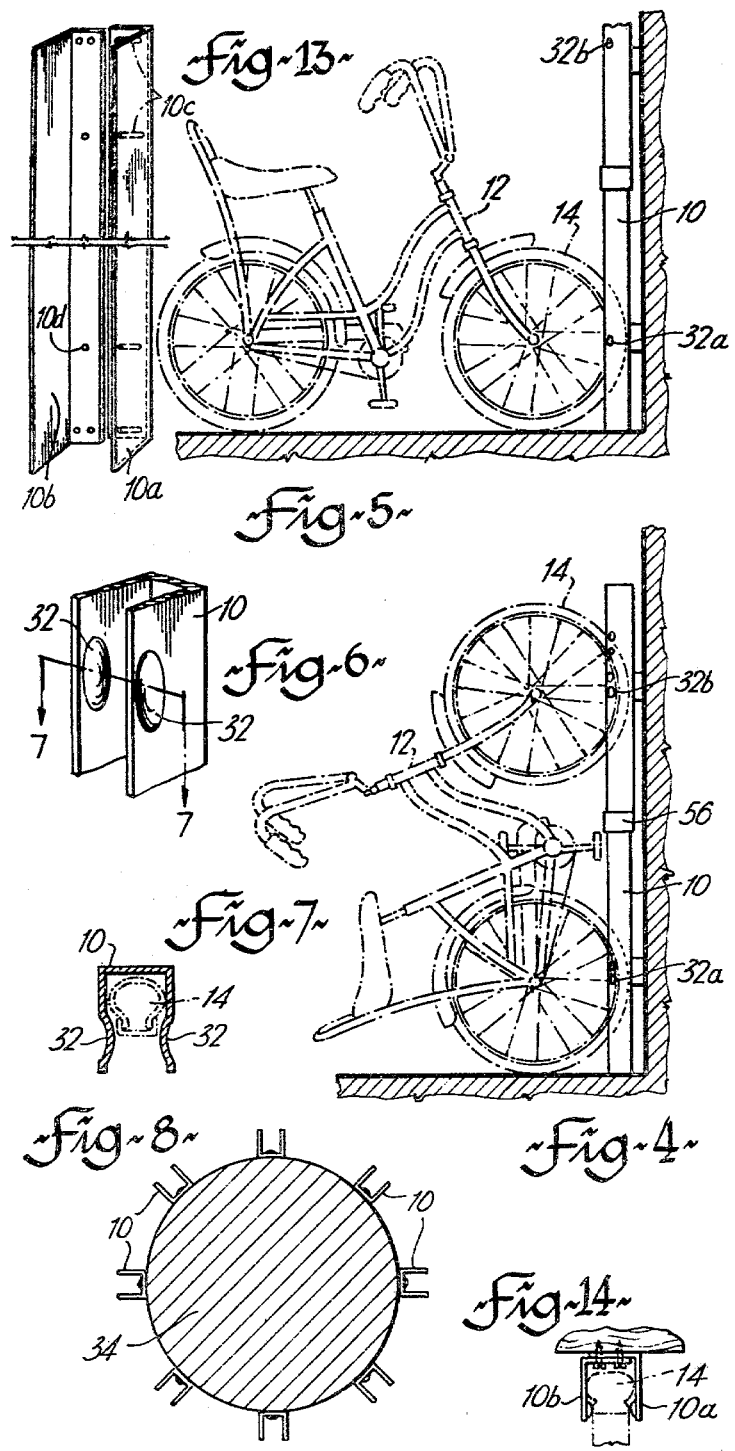

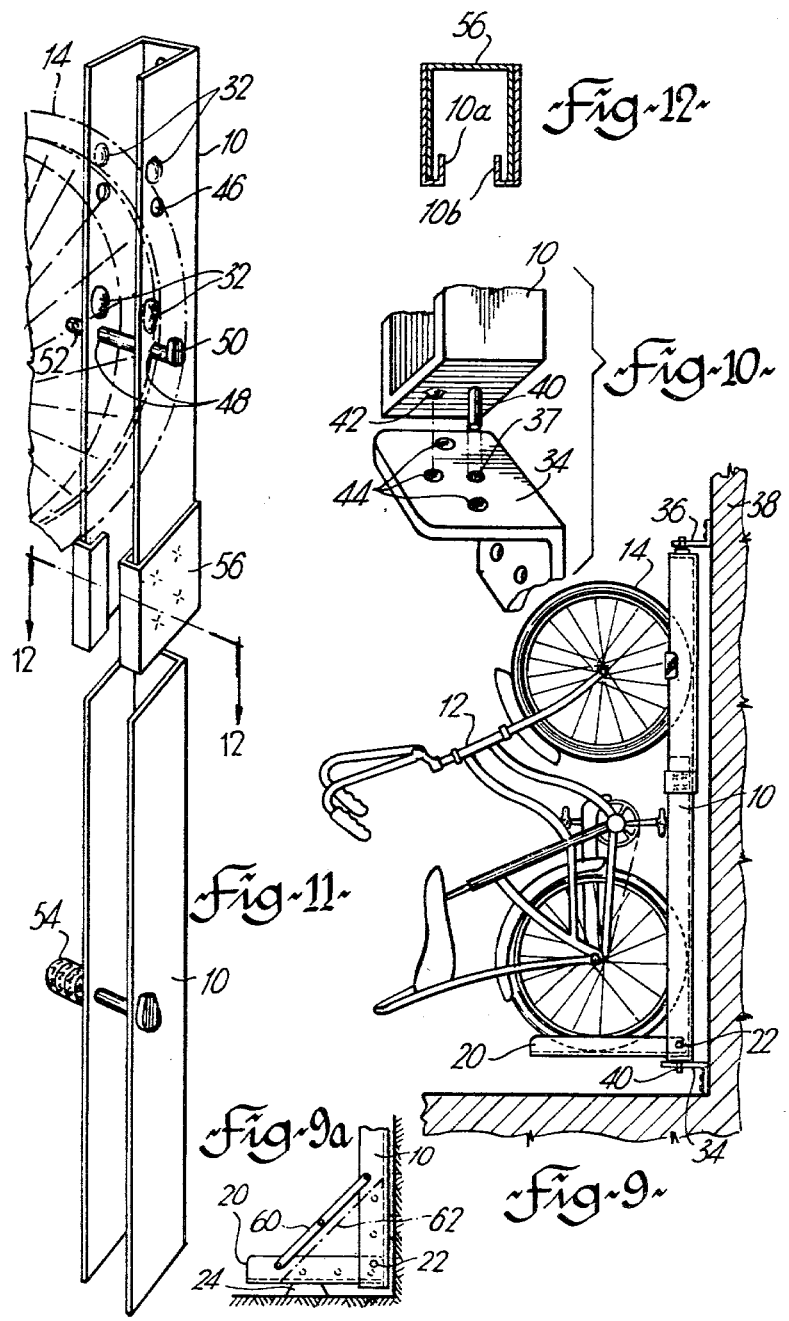

BICYCLE STORAGE RACK

THE RELATED APPLICATION

The present application is a continuation-in-part of Serial No. 806,307, filed June 13, 1977 and now abandoned, having the same title, for which all equitable rights are claimed.

There are many known bicycle storage racks, all of which are designed to maintain a bicycle in a horizontal position, with both bicycle wheels on or near the ground.

An object of the present invention is to provide a bicycle rack adapted to store a bicycle in a vertical position, with the rear wheel on or near the ground, and the front wheel of a bicycle directly thereabove.

A prior art device which is directed to a vertical storage apparatus for bicycles is disclosed in Canadian Pat. No. 53,050 of July 28, 1896. The apparatus of this old Canadian patent involves the use of a horizontal U-bracket, adapted to surround the entire front wheel of a bicycle, when it is resting against a vertical support such as a wall or the like.

The bicycle rack according to the subject invention employs a vertical U-channel, of a depth slightly greater than the thickness of a bicycle tire and rim, with restraint means for engagement with the tire and rim only. Thus, vertical U-channels having a width slightly thicker than the standard tire widths will be provided, as, 1¼", 1⅜", 1½", and 1¾", as well as wider channels, to accomodate balloon tires or the like.

It is an object of this invention to provide a vertical storage rack for bicycles which may selectively be used to store a bicycle either in a vertical or in a horizontal position.

A further object is to provide a vertical bicycle rack which permits storage of a bicycle in a vertical attitude, either at right angles to the supporting vertical wall or the like, or which may be selectively pivoted on the supporting vertical wall or the like, or which may be selectively pivoted on the supporting rack, to a more acute angle, relative the supporting wall or the like.

A still further object is to provide a vertical bicycle rack comprising a plurality of individual racks radially mounted on a central support member, whereby a plurality of bicycles may be stored in vertical position, and a minimum of overall floor or ground space be required, as for example, in a showroom or a parking lot environment.

A primary object is to provide a bicycle storage rack comprising a U-channel adapted for mounting on a vertical supporting surface; said U-channel being deeper and slightly wider than the depth and width of a bicycle tire when rim mounted; said U-channel being constructed of material which enables the resilient distension of the arm of the U-channel; said U-channel having a plurality of rigid restraint means along the length thereof, said restraint means being adapted under the force of the insertion of the bicycle wheel to distend the arms of the U-channel relative to its base and engage over the wheel and rim releasably to restrain the front wheel by the wheel and rim thereof when said bicycle is selectively in a vertical position with its rear wheel resting on or near the ground, or in a horizontal position with both its front and rear wheels resting on or near the ground, and the tire and rim of the front wheel of said bicycle being contained within said U-channel by said restraint means.

These and other objects of the invention will become apparent with reference to the accompanying drawings, wherein:

FIG. 1 is a perspective view of one embodiment of a plurality of bicycle racks according to the invention, with one bicycle illustrated in vertical storage position;

FIG. 2 is a side elevation of the bottom portion of a storage rack according to FIG. 1, in enlarged scale, and partly in section;

FIG. 3 is a perspective view, in an enlarged scale, of one embodiment of a bicycle wheel restraining means according to FIG. 1;

FIG. 3A is a view similar to that of FIG. 3 showing still another embodiment;

FIG. 4 is a side elevation of an alternative embodiment of a vertical bicycle storage rack with a bicycle illustrated in storage position, in broken lines;

FIG. 5 is a side elevation according to FIG. 4, with a bicycle shown in broken lines, in horizontal storage position;

FIG. 6 is a perspective fragment of the storage rack of FIGS. 4 and 5, illustrating bicycle wheel restraining means;

FIG. 7 is a sectional view taken along line 7—7 of FIG. 6;

FIG. 8 is a top plan view of a bicycle storage cylindrical pedestal rack, adapted for radial storage of a plurality of bicycles either in vertical or horizontal attitude;

FIG. 9 is a side elevation, partly in section, of an alternative embodiment of a vertical storage rack for bicycles, adapted for pivotal movement toward the supporting wall;

FIG. 9a is a perspective view of a brace support for the alternative embodiment of FIG. 9;

FIG. 10 is a fragmentary perspective view of a pivot support according to the embodiment of FIG. 9;

FIG. 11 is a perspective view of a bicycle support rack illustrating a telescopic connection means;

FIG. 12 is a sectional view taken along line 12—12 of FIG. 11;

FIG. 13 is a perspective view of an alternative embodiment of a U-channel; and

FIG. 14 is a top plan of the channel of FIG. 13, with a bicycle wheel illustrated in section, restrained therein.

Detailed reference will now be made to the drawings, wherein like reference numeral will identify like parts.

Referring to FIG. 1, a vertical U-channel 10 is shown supporting a bicycle 12 in vertical storage position. The U-channel is preferably formed of material which renders it slightly resilient such as metal or plastics. Front wheel 14 of bicycle 12 is shown restrained with the bight of the U-channel 10 by a pair of rigid non flexible non-resilient restraint members 16a and 16b, illustrated more clearly in FIG. 3, where it will be seen that restraint members 16a and 16b are engaged with the lips of U-channel 10, and held thereon by means of threaded wing bolts 16c and 16d respectively. Thus, it will be appreciated that restraint members 16 may be vertically adjusted along the lips of channel 10, according to the length of the bicycle to be restrained therein. Alternatively, the interior of restraint members 16 a may be provided with an internal thread, adapted to threadable engagement with wing bolts 16c; and 16d, with a hole 17 being provided in each wall of channel 10, as seen in FIG. 3A at positions spaced along the lip suitable to accommodate bicycles of various frame sizes. Alternatively, the restraint members may be small wooden or plastic T-shaped members 16e (FIG. 3A) having an enlarged head and a stem; the stem being adapted to be force fit in the holes 17 with the head lying on the inside surface of the axes of the U-channel.

Referring again to FIG. 1, it will be seen that lower bicycle wheel 18 is supported by a horizontal U-shape channel 20, pivotally mounted at 22 to vertical U-channel 10. A bottom support 24 is affixed to horizontal channel 20, as is seen more clearly in FIG. 2. With reference to FIG. 1 and FIG. 2, it will be seen that U-channel 20 may be pivoted from a horizontal to a vertical position, as shown in broken lines in FIG. 2, and illustrated in FIG. 1 in two of the vertical storage racks illustrated without a bicycle engaged thereby. Ground support 24 may be affixed to channel 20 by means of screw nail 26, as illustrated in FIG. 2, although any other suitable attachment means will of course be equally appropriate. As further illustrated in FIG. 2, vertical channel 10 may also be conveniently affixed to a supporting wall, as by means of screw nails 28, or as is otherwise convenient.

The operation of the vertical storage rack of FIGS. 1–3A is as follows: Bottom horizontal support 20 is first pivoted downward to the position illustrated in FIG. 2, the front wheel of bicycle 12, with the bicycle held horizontally on the ground, front wheel 14 is then advanced to mount into horizontal U-channel 20, and pushed forwardly and upwardly within vertical U-channel 10, until the bicycle reaches the position illustrated in FIG. 1, in order to determine the desired position for wheel restraint members 16. When wheel restraint members 16 have been engaged on the lips of U-channel 10, the front wheel 14 of bicycle 12 will be readily restrained thereby, by urging of front wheel 14 forwardly into channel 10 past wheel restraints 16, such passage being facilitated by the slight flexibility or give of the walls of plastics or metal channel 10. Removal of the bicycle from its storage position is readily accomplished by reversing the above steps. When the racks according to the invention are not in use, as may be desired in a confined automobile garage, horizontal support channels 20 may be conveniently pivoted upwardly into vertical channel 10, in order to conserve space.

The provision of horizontal bottom support channel 20 facilitates storage of bicycles having relatively full rear fenders 30. It will be appreciated that the rack disclosed in FIGS. 1, 2 and 3 would be functional without bottom support channel 20. With full rear fender 30, however, it is necessary that the wheel support be slightly above ground, in order to avoid the weight of the bicycle being supported on rear fender 30.

Turning now to the embodiment of FIGS. 4 and 5, it will be seen that a bottom support channel 20 is not employed. Thus, the embodiment of FIG. 4 and 5 is designed for use with bicycles having only a partial or no rear fender. Further, as illustrated in FIG. 5 U-channel 10 is also adapted to support bicycle 12 in horizontal storage position, by engagement with front wheel 14. Alternative wheel restraint means are illustrated in FIGS. 4, 5, 6, and 7, to wing-bolt held wheel restraint means 16 of FIGS. 1 and 3. As is illustrated most clearly in FIG. 6, a pair of aligned inwardly projecting dimples 32, (see also FIG. 7) are provided in the walls of channel 10, at heights appropriate to restrain the front wheel of a bicycle in horizontal storage position, as at 32a of FIG. 5, or in vertical storage position as at 32b in FIG. 4. A plurality of dimples 32 may be provided along the length of U-channel 10, in order to accomodate bicycles of various frame sizes. The dimples, while formed in the material of the U-channel are relatively rigid and fixed and thereby cause the U-shaped channel to distend on entry of the wheel.

With reference to FIG. 4 it will be further appreciated that vertical adjustment of dimple 32b may be readily accomplished by vertically adjusting the upper portion of channel 10 relative to the lower portion, as will become clear hereinafter with particular reference to FIGS. 11 and 12 of the drawings.

In FIG. 8 storage racks according to the invention are illustrated in top plan, supported on a vertical cylindrical pedestal 34. The function of such a storage arrangement is believed self-evident, and is particularly adapted for use where space is at a minimum, as, for example, in a bicycle showroom, or in a parking area at schools and shopping centers.

Referring now to FIGS. 9, 9a and 10, a further embodiment of the bicycle storage rack according to the invention is illustrated, with vertical U-channel 10 being pivotally mounted on a supporting wall 38 or the like by means of a pair of pivot mounts 34 and 36, with lower pivot mount 34 and upper pivot mount 36 maintaining U-channel 10 in vertical alignment, slightly remote from a supporting wall, or the like, 38. Referring to FIG. 9a, a bracing means for bottom channel 10 is illustrated at 60, in the nature of a pair of pivot arms pivotally attached to one end to channel 10 and at the other end to bottom channel 20. The structure permits channel 20 to be pivoted upward on pin 22, for storage purposes. Alternatively a permanent triangular base 62 (as shown in broken lines in FIG. 9a) may be bolted or otherwise affixed to channel 10 and bottom channel 20, to provide rigidity therefor.

Referring to FIG. 10 it will be seen that U-channel 10 is provided at its bottom center with a downwardly extending finger 40, adapted for rotatable engagement within a central hole 37 provided in bottom bracket 34. A downwardly projecting nipple 42 is provided on the bottom of U-channel 20 and a plurality of depressions 44, adapted to receive nipple 42 are provided on the surface of support bracket 34 facing the bottom of channel 10. Thus, when a bicycle has been mounted in vertical position as illustrated in FIG. 9, and is restrained in vertical U-channel 10, the bicycle 12 and the supporting storage rack may be pivoted toward supporting wall 38, to minimize the amount of storage space consumed and held in such position by cooperation of nipple 42 in one of depressions 44.

Illustrated in FIG. 11 is a locking means which may be utilized with the embodiments already disclosed, to secure a bicycle in either horizontal or vertical storage position, and as well a telescopic union is illustrated. According to this embodiment, channel 10 is readily vertically adjustable to accomodate bicycles of various frame sizes. As will be evident, the upper portion of channel 10 may be vertically raised or lowered relative to bottom portion of channel 10, so that the wheel restraint means will be adjusted accordingly. Additionally, channel 10 may be more conveniently shipped, in two short sections, rather than one long section.

As seen in FIG. 11, a plurality of aligned holes are provided in the walls of channel 10 at 46 and 48, holes 46 and 48 being adapted to receive a locking pin as illustrated at 50, to restrain bicycle wheel 14 within channel 10, as illustrated partly in broken lines. Pin 50 may be conveniently provided with a hole 52, to receive a padlock, not illustrated. Thus, when a bicycle is in storage position and pin 50 is passed through the holes in channel 10, inside the rim of front wheel 14 of bicycle 12, secure storage is assured. If desired, corresponding holes and locking pins may be provided for both the front and rear wheels of a bicycle being stored in vertical position. As further illustrated in FIG. 11, for this purpose, a pin-combination lock 54 may also be utilized.

As further illustrated in FIGS. 11 and 12 channel 10 is constructed in two sections, adapted to be united by a telescopic engagement 56 which may conveniently be spot-welded or otherwise adhesed to one of the sections of channel 10, and thence engaged with the second section, at the time the channel is mounted in its permanent rack position. As illustrated further in FIG. 12, one end of channel 10 may itself form a telescopic engagement means, with inwardly extending lips 10a, 10b, adapted to receive the second section of channel 10.

Referring now to FIGS. 13 and 14 channel 10 is seen to comprise a pair of vertical L-shaped members 10a and 10b, member 10a being provided with a plurality of horizontal slots, and channel member 10b being provided with a plurality of holes 10d whereby channel members 10a and 10b may be adjustably bolted together, and the width of the resulting U-shaped channel be readily adjustable to accomodate bicycle tires of the standard widths, as, for example, from 1¼" through to the widest balloon type tire.

As seen from the foregoing the present invention permits the construction of a simple storage rack, out of metal or plastics, wherein the restraint members may be easily adjusted so that bicycles of any size, with tires and wheels of any size, can be stored in vertical position. The restraint members, preferably used in opposed pairs, are rigid and do not per se act as clamp members. That is, they are neither flexible or resilient under pressure from the bicycle wheel. The restraint members act primarily to restrict the bight of the U-channel, rendering the otherwise slightly larger bight smaller than the width of the tire and wheel assembly. As a consequence, the introduction of the bicycle wheel must be forced, resulting first in the outward distension of the arms due to the resilient construction of the channel until the wheel is fully inserted and thereafter the automatic, resilient snap back of the arms, places the head portion, or domed portion of the restraint member, over the rim of the bicycle wheel, as seen for example in the cross sectional views of FIGS. 8 and 14. The enlarged head portion of the restraint member thus has a curving inclined edge or arcuate surface portion engaging the lateral surfaces of the wheel rim, holding the wheel and tending to push the wheel deeper into the bight of the U-channel. Locking devices, such as hasps, brackets or the like are not necessary to sustain the bicycle in vertical position. The use of locking devices for theft prevention, may be considered extraneously. The absence of locking devices, however, insure that the bicycle may be easily removed, and avoid damage such as twisting of the wheel, should the bicycle be accidently dislodged or knocked over.

What is claimed:

1. A bicycle storage rack comprising an elongated U-channel adapted for vertical mounting on a vertical supporting surface;
    said U-channel being formed of a rigid material bent along a pair of parallel bend lines to form a pair of arms extending the length of said channel in opposition to each other, said arms being deeper than the depth of a bicycle wheel with tire when rim mounted and flexible along the bend lines thereof with respect to each other to have a normal bias wherein the space between said opposing arms has a distance less than the width of the bicycle tire and rim and to be distendible on entry of the bicycle tire and rim to a distance slightly wider than said tire and rim, and thereafter releasably return to the normal bias so as to clamp the tire and rim thereof when said bicycle is secured in a vertical position with its other wheel resting on or near the ground, each of said arms having a plurality of holes adjacent its outer edge extending along the length thereof, the holes in one arm being horizontally aligned with the holes in the opposite arm to form opposing pairs across the bight of said U-channel wheel restraint means comprising a pair of restricting members each of which is located in a hole on an arm of said U-channel adjacent the free edge thereof in opposition to each other, to thereby reduce the space between said opposing arms to a distance less than the width of the bicycle tire and rim, said restraint means causing said arms to distend on entry of the bicycle tire and rim and thereafter, at least in part, surrounding said wheel and rim to releasably clamp the wheel within said channel.

2. A bicycle storage rack according to claim 1, said U-channel being vertically mountable on a vertical supporting surface by means of an upper and lower pivotal mount, whereby said U-channel may be selectively pivoted through 180° relative to said vertical supporting surface.

3. A bicycle storage rack according to claim 1, in combination with a vertical cylindrical support member, having a plurality of such bicycle storage racks vertically affixed thereto in spaced relationship.

4. A bicycle storage rack according to claim 1, said U-channel having a U-shaped base channel pivotally mounted near the bottom thereof, said base channel being selectively pivotable to a horizontal position to support the weight of a bicycle when stored in vertical position by engagement with the rear wheel thereof;
    said U-shaped base channel being pivotable to a vertical, storage, nesting position within said vertical U-channel.

5. A bicycle storage rack according to claim 1, said vertical U-channel being formed of at least two sections and having a telescopic uniting member adapted for engagement with said sections, when said vertical U-channel is affixed to a vertical supporting surface.

6. The bicycle storage rack according to claim 1 wherein said restricting members comprise a T-shaped member having a stem adapted to be set into a hole in a respective one of said arms of said U-channel and having an enlarged head extending into the space between the arms of said U-channel.

7. A bicycle storage rack according to claim 1 wherein said restricting members are adapted to engage the free edge of the arms of said U-channel with said restricting members further including an internally threaded portion adapted to receive a threaded locking bolt whereby said restricting members may be removably positioned with the bolt engaging the holes of said U-channel.

* * * * *